United States Patent [19]

Hakamada et al.

[11] 4,239,998

[45] Dec. 16, 1980

[54] METHOD FOR ELECTRICALLY INSULATING AN ELECTRICALLY CONDUCTING ARTICLE AND PRODUCT PRODUCED THEREBY

[75] Inventors: Takeshi Hakamada, Hitachi; Hideyo Hirata, Ibaraki; Toshio Katoh, Hitachi, all of Japan

[73] Assignee: Hitachi, Ltd., Japan

[21] Appl. No.: 886,422

[22] Filed: Mar. 14, 1978

[30] Foreign Application Priority Data

Mar. 19, 1977 [JP] Japan ................................. 52-30750

[51] Int. Cl.² ..................... H02K 15/12; H01F 27/30; H01B 7/00
[52] U.S. Cl. ..................................... 310/45; 310/215; 174/120 SR; 174/121 R; 336/206; 428/251; 428/268; 428/324
[58] Field of Search .............. 428/212, 241, 251, 268, 428/273, 324, 415, 417, 429; 174/120 R, 120 SR, 121 R, 121 SR; 310/45, 269, 215; 336/206

[56] References Cited

U.S. PATENT DOCUMENTS

| 4,013,987 | 3/1977 | Foster | 428/417 |
| 4,038,741 | 8/1977 | Schuler | 174/120 SR |

FOREIGN PATENT DOCUMENTS

1090733 10/1960 Fed. Rep. of Germany ............ 310/45
1447500 1/1976 United Kingdom .
1462200 1/1977 United Kingdom .

OTHER PUBLICATIONS

Hakamada et al., "New Class H Insulation Systems for Medium Capacity Rotating Machines", Hitachi Review, 25:12 (1976).

Primary Examiner—William R. Dixon, Jr.
Attorney, Agent, or Firm—Craig and Antonelli

[57] ABSTRACT

A method for producing electrically insulated apparatus, which may be used in windings for rotary electric machines, for example, an induction motor, synchronous machines, DC machines or stationary induction apparatus, for example, transformers, and the product produced thereby comprising an electric conductor and an insulating layer formed around the electric conductor, wherein said insulating layer contains a resin having excellent permeability for the gas generated in the layer, e.g., a silicone resin, and a resin having excellent adhesive force in an appropriate blending ratio in order to impart excellent thermal resistance to the electrically insulated apparatus.

21 Claims, 3 Drawing Figures

METHOD FOR ELECTRICALLY INSULATING AN ELECTRICALLY CONDUCTING ARTICLE AND PRODUCT PRODUCED THEREBY

LIST OF PRIOR ART (37 CFR 1.56 (a))

The following references are cited to show the state of the art:

T. Hakamada et al., Hitachi Review, Vol. 25, 393–398 (1976)

British Pat. No. 1,462,200

The present invention relates to electrically insulated apparatus, which must have thermal resistance, and the process for producing this apparatus. Particularly, the invention pertains to a dry insulating system which may be used to insulate rotary electric machines such as an induction motor, synchronous machines, DC machines, etc. and stationary induction apparatuses such as transformers, etc.

There are three problems in the insulating system for windings which must be provided with thermal resistance.

The first problem is that the insulating system must not be subjected to extreme thermal degradation for a long period of time. Thermal degradation in dry insulation is in the form of oxidative degradation owing to sufficient supply of oxygen. As a result, the intermolecular bond in organic substances in the insulating system, for example, impregnating resins such as an epoxy resin, etc. is broken. Thereby, the organic substances become brittle and lose their mechanical strength until electric breakage is brought about. The oxidative degradation of the organic substances becomes rapid with an increase in temperature according to Arrhenius' theory of reaction rate. Therefore, it is necessary for the insulating system to prevent the supply of oxygen.

The second problem is that the decomposed gas generated by the oxidative degradation of organic substances promotes the decomposition of the other organic substances contained in the insulating system through the steps of melting or becoming brittle.

The third problem is that the decomposed gas generated is not released out of said insulating system owing to the rapid decomposition of the insulating system comprising organic substances, the decomposed gas is accumulated in the insulating system, and as a result, the accumulated pressure of the decomposed gas causes peeling in the insulating system when the insulating system is used at remarkably high temperatures, for example, at a temperature of 220° C. or more. The peeling in the insulating system causes reduction in heat conduction in the insulating system and an increase in temperature. It is needless to say that it is desirable for the insulating system to have a high thermal conductivity.

As the required thermal resistance increases from 155° C. (class F) to 180° C. (class H), 205° C. (class C) or 230° C., not only the first problem but also the second problem and the third problem arise together.

To solve only the first problem, polyester resins, epoxy resins, polyamide resins, polyimide resins, silicone resins, etc. are used according to the required thermal resistance and a satisfactory result can be obtained. Under use conditions near to their endurable temperature limit, which differ according to the kind of the resins, however, the second and third problems which arise unavoidably together with the first problem can not be solved. At higher temperatures exceeding 220° C., any existing organic substance which can be used to insulate windings necessarily encounters the second and third problems.

An object of the present invention is to solve these problems.

Another object of this invention is to provide a thermally stable electric insulating apparatus.

The other objects and advantages of the present invention will be apparent from the following description.

According to the present invention, there is provided an electrically insulated apparatus comprising an electric winding and an insulating layer comprising an insulating tape wound around the electric winding wherein said wound insulating tape is impregnated with a resin which has been cured after impregnation and said resin consists of the first resin and the second resin, the first resin being superior to the second resin in permeability for the gas generated in the insulating layer, the second resin being superior to the first resin in the adhesive force between the tapes after curing of the resins, and a ratio b/a of the amount of the second resin b to that of the first resin a is 0.5:1 to 5:1 by weight. Also provided is a method of producing the electrically insulated apparatus.

Thus, in order to accomplish the above-mentioned objects, the present invention does not rely upon only the insulating materials used but relies upon the whole insulating system. In the insulating layer formed around an electric conductor, a resin having excellent permeability for the gas generated in the insulating layer and a resin having excellent adhesive force are used.

In the accompanying drawing.

Figure 1:
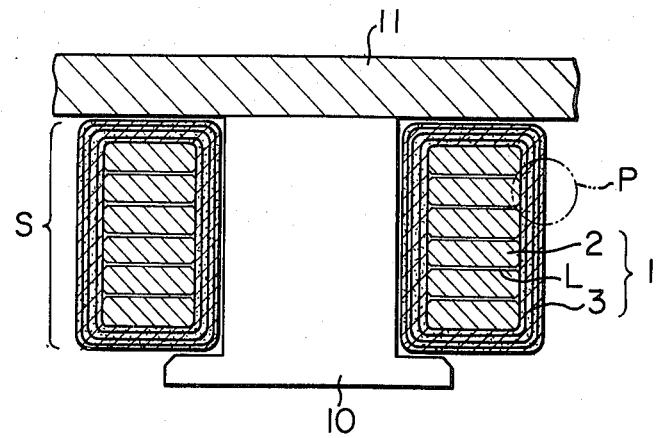
FIG. 1 is a longitudinal sectional view of a field pole of a DC motor as one embodiment of the electric insulating apparatus according to the present invention.

In FIG. 1, which shows a field winding of a DC motor as an electric electrically insulated apparatus, the field winding 1 is composed of a winding conductor 2 which has been wound an appointed number of times and contains a layer insulator L between the respective wound layers and an insulating layer 3 formed around the winding conductor 2. The field winding 1 is installed on a field core 10, which is fixed by a fixing means such as a bolt onto a yoke 11, which is a stationary member of a DC motor and is a magnetic path, to constitute a field pole.

Figure 2:
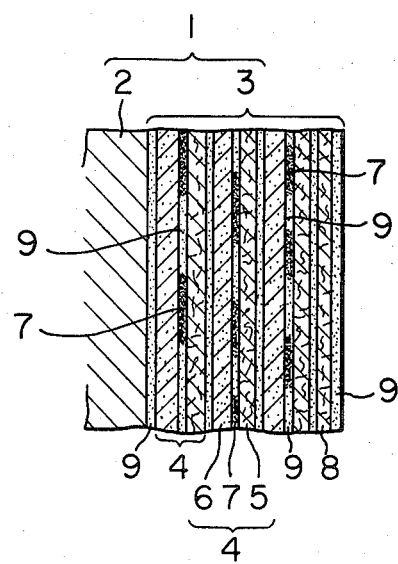
FIG. 2 is an enlargement of the part P of FIG. 1.

The constitution of the field winding 1 as explained above is the same as in prior art DC motors. In the field winding 1 according to the present invention, however, an improvement has been made to the structure of said insulating layer 3. Thus, as shown in FIG. 2 in detail, said insulating layer 3 consists of an insulating tape 4 wound around the winding conductor 2, a protective tape 8 wound around the outer periphery of the wound insulating tape 4, and a resin 9 which is impregnated into the wound tapes 4 and 8 to unify firmly the winding conductor 2 and the respective tapes 4 and 8. As said insulating tape 4 is used a woven fabric or non-woven fabric consisting of a glass fiber or a polyamide fiber or mica, etc. which are all excellent in thermal resistance. As mica, there are flake mica and integrated mica obtained by pulverizing the flake mica and then forming the resulting powdery mica into a sheet. In order to solve said first to third problems in the case of mica, however, it is desirable from a viewpoint of uniformity to use the integrated mica. Also, it is difficult to use mica alone. Therefore, it is necessary to use a backing material such as a woven fabric or non-woven fabric of a glass fiber or a polyamide fiber, etc. or a polyimide resin film to reinforce the mica. In order to be adhesive with the resin 9 subsequently impregnated, it is desirable to use said woven fabric or non-woven fabric, which are porous base materials, as a backing material. In FIG. 2, a so-called mica tape consisting of mica 6 reinforced with a backing material 5 is used as an insulating tape 4.

On the other hand, the protective tape 8 is wound only to protect said insulating tape 4. Therefore, a glass cloth tape having high mechanical strengths is generally used as the protective tape 8. Also, the insulating tape 4 is previously impregnated with a resin 7 which is different from the resin 9 subsequently impregnated. For the convenience of explanation, the resin 7 previously impregnated is referred to as "the first resin" and the resin 9 subsequently impregnated is referred to as "the second resin". The first resin 7 must be superior to the second resin 9 in permeability for the gas generated in the insulating tape 4. The gas permeability of the respective heat-resistant resins was measured. The results obtained are as shown in Table 1.

TABLE 1

| Resin | Gas | |
|---|---|---|
| | $CO_2$ | $O_2$ |
| Epoxy | 100 | 733 |
| Silicone | 500 | 244 |
| Urethane | 89 | 33 |

The numeral values in Table 1 represent the relative permeability for various gases of the respective resins based on the $CO_2$ permeability of epoxy resin (which is represented as 100). As is clear from Table 1, in the case of epoxy resins, permeability for oxygen gas is 7 or more times permeability for carbon dioxide gas. At such a permeability for oxygen gas, the supply of oxygen into the insulating layer 3 is too much and oxidative deterioration, which is the above-mentioned first problem, easily occurs. On the other hand, the amount of the carbon dioxide gas, generated by oxidative degradation, which is released is small. Therefore, the above-mentioned second and third problems, that is, the decomposition of organic substances and the peeling of the insulating layer are caused by the accumulation of the gas. In the case of silicone resins, permeability for carbon dioxide gas is 2 or more times the permeability for oxygen gas. As compared with epoxy resins, permeability for carbon dioxide gas is 5 times and permeability for oxygen gas is ½. Therefore, the second and third problems, occurring in epoxy resins, do not occur in silicone resins. Also, in the case of urethane resins, permeability for carbon dioxide gas is about 3 times permeability for oxygen. As far as these data are concerned, urethane resins are most excellent in a ratio of the amount of carbon dioxide released to the amount of oxygen gas supplied. As the absolute values of gas permeabilities are small, however, it is difficult to use urethane resins. Therefore, it is desirable to use silicone resins as the first resin 7.

As the second resin 9, a good impregnating property is required in order that said insulating tape 4 and protective tape 8 form a uniform multiple layer and a fine insulating layer 3 is formed after impregnation. Therefore, resins which show a viscosity of several poise on vacuum impregnation are desirable. Also, the second resin must be able to adhere the respective layers of the formed multiple insulating layer 3 to each other with high mechanical strength. The characteristics required to accomplish these objects of heat-resistant resins were measured. The results obtained are as shown in Table 2.

TABLE 2

| | Characteristics | |
|---|---|---|
| Resin | Viscosity at 25° C. (poise) | Tensile strength (kg/mm$^2$) |
| Epoxy | 2.9 | 5.2 |
| Silicone | 24.0 | 0.5 |
| Epoxy-isocyanate | 1.4 | 7.6 |

As is clear from Table 2, silicone resins used as said first resin have a high viscosity and are not suitable for impregnation. Further, their adhesive force is low. Therefore, it is impossible to use only silicone resins for adhesive wound layers of the insulating tape 4 and the protective tape 8. On the other hand, epoxy resins and epoxy-isocyanate resins have a viscosity of less than 3 poise and are excellent in adhesive force. Therefore, these resins are effective as the second resin 9.

When an insulating layer 3 is formed, it is required, for balancing the permeability for the gas generated in the insulating layer and the adhesive force, to select an appropriate ratio of the amount of the second resin used to the amount of the first resin used. As described above, peeling and swelling occur between the wound layers of the respective tapes and heat conduction is obstructed if the gas generated in the insulating layer 3 is accumulated. The same phenomenon also occurs when the adhesive force between said wound layers is poor. Therefore, the permeability for the gas generated in the insulating layer and the adhesive force must not be merely emphasized, but the permeability for the gas and the adhesive force required for the insulating layer 3 must be obtained by selecting an appropriate ratio of the amount of the second resin to the amount of the first resin.

A field winding model was actually prepared and an appropriate range of ratios of the amount of the second resin b to the amount of the first resin a was examined by widely varying the ratio b/a. The model field winding as prepared is shown in FIGS. 1 and 2. As the insulating tape, a so-called glass-backed mica tape having a thickness of 0.13 mm, obtained by adhering integrated mica onto a glass cloth tape with a silicone resin, as the first resin was used. The glass-backed mica tape was three times wound around a winding conductor so that a half of the width of the tape might be wrapped. An unimpregnated glass cloth tape having a thickness of 0.18 mm was once wound around the wound glass-backed mica tape so that a half of the width of the tape might be wrapped. An epoxy-isocyanate resin as the second resin was impregnated into the wound layers of the respective tapes according to a vacuum impregnation process. The epoxy-isocyanate resin is a resin produced by blending 0.1 to 0.5 equivalent weight of a polyfunctional epoxy compound with 1 equivalent weight of a polyfunctional isocyanate compound, and then curing the resulting resin composition in the presence of a hetero ring forming catalyst. (With regard to details of the epoxy-isocyanate resin, see British Pat. No. 1,447,500 and Australian Pat. No. 470,978.) Heating and pressure forming were then carried out to prepare a field winding model.

Figure 3:
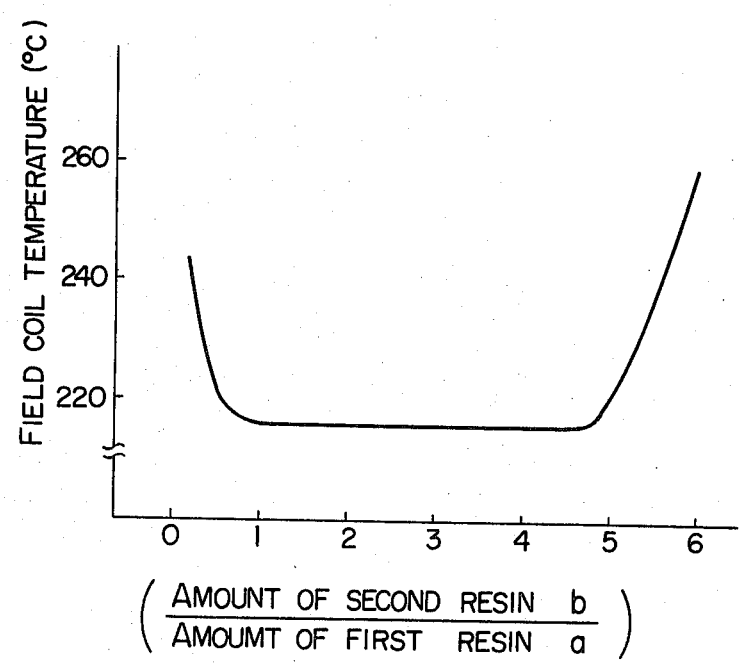
FIG. 3 shows a relationship between field coil temperature and a ratio of the amount of the second resin to that of the first resin b/a in the field winding as shown in FIG. 1.

An electric current was sent to the field winding model to increase the temperature to 220° C. In this case, a change in the temperature according to a change in a ratio b/a of the amount of the second resin b to the amount of the first resin a was examined. The results obtained are as shown in FIG. 3. As is clear from FIG. 3, a b/a value within a range of 0.5:1 to 5:1 by weight gives the lowest temperature value. Therefore, a ratio of the amount of the second resin to the amount of the first resin within this range may be used. The reasons for the temperature increase when b/a is less than 0.5:1 by weight are considered to be as described below.

When the amount of the silicone resin as the first resin is large, the gas permeability of the insulating layer is good but the adhesive force between the wound layers of the respective tapes is weak. On use at a high temperature of 200° C. or more, peeling between the layers occurs and heat conduction is obstructed. As a result, the temperature increases.

In fact, when the insulating layer of the field winding was dismounted, it was found that many peelings had occurred not only between the winding conductor and the insulating layer but also between the wound layers in the insulating layer.

On the other hand, if b/a is more than 5:1 by weight, the amount of the second resin having excellent adhesive force is large. Therefore, the adhesive force of the insulating layer is high but the gas permeability of the insulating layer is low. As a result, the gas generated in the insulating layer accumulates in the insulating layer, substantially without permeating out of the layer. As described above, an increase in the pressure of the accumulated gas is considered to cause peeling in the respective parts and an increase in temperature. In this case, when the insulating layer of the field winding was dismounted, it was found that large peelings occurred although the number of the peelings was smaller. The places where the peelings in the insulating layer occurred in this case were on the side of a surface free from an obstacle and having a larger surface area (as shown by "S" in FIG. 2).

If b/a is within the range of 0:5:1 to 5:1 by weight, however, the gas permeability and adhesive force of the insulating layer are considered to be properly balanced. In fact, when the insulating layer of the field winding was dismounted, it was found that small peeling occurred locally. Even the occurrence of such small peeling was not found when the insulating layer of a field winding wherein b/a was within the range of 0.5:1 to 5:1 by weight was again prepared and was then dismounted. Thus, an excellent insulating layer can be formed if b/a is from 0.5:1 to 5:1 by weight.

The above-mentioned experiments were carried out by using an epoxy-isocyanate resin as the second resin. Whan a change in temperature was likewise measured by using an epoxy resin as the second resin, results almost corresponding to the curve in FIG. 3 were obtained, and it was again confirmed that b/a was preferably within the range of 0.5:1 to 5:1 by weight.

Also, the above-mentioned explanation of the present invention was made with regard to a field winding for a DC motor. However, it is needless to say that the explanation can also be applied to a field winding for the salient magnetic poles of a synchronous machine, a winding for an induction motor and a winding for a transformer, which have respectively a shape similar to that of said field winding.

As described above, according to the present invention, a thermally stable electrically insulated apparatus, wherein permeability for the gas generated in the insulating layer and the adhesive force of the insulating layer are balanced, can be provided, where a first resin having excellent permeability for the gas generated in the insulating layer and a second resin having excellent adhesive force are contained in the insulating layer and a ratio b/a of the amount of the second resin b to the amount of the first resin a is within a range of 0.5:1 to 5:1 by weight.

What is claimed is:

1. A method for electrically insulating an electrically conducting article which conprises winding an insulating tape containing a first resin around an electrically conducting article, impregnating the wound insulating tape with a second resin, and curing the second resin, thereby forming an insulating layer around the electrically conducting article, characterized by the first resin being a silicone resin, by the second resin being a resin having a larger force of adhesion between the windings of the tape, after curing, than said first resin, after curing, and by a ratio of the second resin b to the first resin a being 0.5:1 to 5:1 by weight.

2. A method according to claim 1, wherein the second resin has a viscosity of less than 3 poise.

3. A method according to claim 1, wherein the second resin is a resin obtained by curing a resin composition consisting mainly of a polyfunctional isocyanate compound and a polyfunctional epoxy compound.

4. A method according to claim 1, wherein the second resin in an epoxy resin.

5. A method according to claim 1, wherein the insulating tape is a tape obtained by making integrated mica adhere to a glass cloth tape by means of the first resin.

6. A method according to claim 3, wherein the insulating tape is a tape obtained by making integrated mica adhere to a glass cloth tape by means of the first resin.

7. An electrically insulated, electrically conducting article comprising an electrically conducting article and an insulating layer comprising an insulating tape wound around the electrically conducting article, produced by the method of claim 1.

8. An electrically insulated, electrically conducting article comprising an electrically conducting article and an insulating layer comprising an insulating tape wound around the electrically conducting article, produced by the method of claim 2.

9. A method for electrically insulating an electrically conducting winding which comprises winding an insulating tape containing a first resin around an electrically conducting winding, said electrically conducting winding being prepared by winding a winding conductor a predetermined number of times and inserting a layer insulator between the wound layers, and impregnating the wound insulating tape with a second resin, and curing the second resin, thereby forming an insulating layer, characterized by the first resin being a silicone resin, by the second resin being a resin having a larger force of adhesion between the windings of the tape, after curing, than said first resin, after curing, and by a ratio of the second resin b to the first resin a being 0.5:1 to 5:1 by weight.

10. A method according to claim 9, wherein the second resin has a viscosity of less than 3 poise.

11. A method according to claim 9, wherein the second resin is a resin obtained by curing a resin composition consisting mainly of a polyfunctional isocyanate compound and a polyfunctional epoxy compound.

12. A method according to claim 9, wherein the second resin in an epoxy resin.

13. A method according to claim 9, wherein the insulating tape is a tape obtained by making integrated mica adhere to a glass cloth tape by means of the first resin.

14. A method according to claim 11, wherein the insulating tape is a tape obtained by making integrated mica adhere to a glass cloth tape by means of the first resin.

15. An electrically insulated, electrically conducting winding comprising electrically conducting winding layers and a layer insulator between the winding layers, and an insulating layer comprising an insulating tape wound around the electrically conducting winding, produced by the method of claim 9.

16. An electrically insulated, electrically conducting winding comprising electrically conducting winding layers and a layer insulator between the winding layers, and an insulating layer comprising an insulating tape wound around the electrically conducting winding, produced by the method of claim 10.

17. A method for electrically insulating a field winding for a DC motor, which comprises winding an insulating tape prepared by bonding integrated mica to a glass cloth tape by means of a silicone resin as a first resin around an electric winding prepared by winding a winding conductor a predetermined number of times and inserting a layer insulator between the wound layers, impregnating the wound insulating tape with a resin obtained by curing a resin composition consisting mainly of a polyfunctional isocyanate compound and a polyfunctional epoxy compound as a second resin, and curing the second resin, thereby forming an insulating layer, a ratio b/a of the second resin b to the first resin a being 0.5:1 to 5:1 by weight.

18. An electrically insulated field winding for a DC motor comprising an electric winding having a layer insulator inserted between layers of the electric winding, and an insulating layer comprising an insulating tape wound around the electric winding, produced by the method of claim 17.

19. A method according to claim 1, 9 or 17 wherein the insulating tape is made of a fabric consisting of mica, glass fiber or polyamide fiber.

20. A method according to claim 1, 9, or 17 wherein a protective tape is wound around the wound insulating tape.

21. A method according to claim 20, wherein said protective tape is a glass cloth tape having a high mechanical strength.

* * * * *